(12) United States Patent
Shimizu et al.

(10) Patent No.: US 7,558,444 B2
(45) Date of Patent: Jul. 7, 2009

(54) TRAVELING-WAVE-TYPE OPTICAL MODULATOR AND METHOD OF ADJUSTING THE SAME

(75) Inventors: Ryo Shimizu, Tokyo (JP); Taishi Maruyama, Tokyo (JP); Tohru Sugamata, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 5 days.

(21) Appl. No.: 11/547,351

(22) PCT Filed: Mar. 30, 2005

(86) PCT No.: PCT/JP2005/006039

§ 371 (c)(1),
(2), (4) Date: Apr. 24, 2008

(87) PCT Pub. No.: WO2005/096077

PCT Pub. Date: Oct. 13, 2005

(65) Prior Publication Data

US 2008/0240644 A1     Oct. 2, 2008

(30) Foreign Application Priority Data

Mar. 30, 2004   (JP)   ............................ 2004-100149
Mar. 30, 2004   (JP)   ............................ 2004-101174

(51) Int. Cl.
*G02F 1/035* (2006.01)
(52) U.S. Cl. ............................................. 385/2; 385/3
(58) Field of Classification Search ........................ None
See application file for complete search history.

(56) References Cited

U.S. PATENT DOCUMENTS 6,674,927 B2    1/2004   Ibukuro (Continued)

FOREIGN PATENT DOCUMENTS

JP           10-054961         2/1998

(Continued)

*Primary Examiner*—Mike Stahl
(74) *Attorney, Agent, or Firm*—Chapman and Cutler LLP

(57) ABSTRACT

To provide a traveling-wave-type optical modulator and a method of adjusting the same, in which an occurrence of a jitter can be suppressed when an optical modulator is driven by using a driver, and, in particular, to provide a traveling-wave-type optical modulator and a method of adjusting the same, in which a degree of freedom is improved when combining the driver and the traveling-wave-type optical modulator and an occurrence of the jitter can be effectively suppressed even after combining the driver and the traveling-wave-type optical modulator.

With reference to a traveling-wave-type optical modulator which includes a substrate having an electrooptic effect, an optical waveguide formed on the substrate, and a modulation electrode performing modulation control on a light wave propagating through the optical waveguide, a driver for controlling driving of the traveling-wave-type optical modulator is connected to the traveling-wave-type optical modulator, and a frequency characteristic (b) of an electro/optical conversion response of the traveling-wave-type optical modulator is adjusted so as to correct a frequency characteristic (a) of a gain of the driver. Preferably, in the adjustment of the frequency characteristic of the electro/optical conversion response, at least one of an impedance value of the modulation electrode or an impedance value of the resistor of termination is adjusted.

8 Claims, 6 Drawing Sheets

U.S. PATENT DOCUMENTS

| | | | |
|---|---|---|---|
| 2003/0091258 A1* | 5/2003 | Uesaka et al. | 385/2 |
| 2005/0013522 A1* | 1/2005 | Doi | 385/3 |
| 2005/0047703 A1* | 3/2005 | Mitomi et al. | 385/2 |
| 2006/0115197 A1* | 6/2006 | Choi et al. | 385/2 |

FOREIGN PATENT DOCUMENTS

| | | |
|---|---|---|
| JP | 11-183858 | 7/1999 |
| JP | 2002-287103 | 10/2002 |
| JP | 2003-329987 | 11/2003 |

* cited by examiner (a)

(b)

(a) BEFORE REDUCING JITTER
JITTER RMS 2.4 ps (b) AFTER REDUCING JITTER
JITTER RMS 1.6 ps

TRAVELING-WAVE-TYPE OPTICAL MODULATOR AND METHOD OF ADJUSTING THE SAME

TECHNICAL FIELD

The present invention relates to a traveling-wave-type optical modulator and a method of adjusting the same. More specifically, the present invention relates to a traveling-wave-type optical modulator and a method of adjusting the same, when a driver for controlling driving of a traveling-wave-type optical modulator is connected to the traveling-wave-type optical modulator.

RELATED ART

In recent years, when an optical modulator is evaluated, characteristics that are called jitters indicating temporal fluctuation of an optical signal obtained when the optical modulator is driven have attracted attention.

The jitter means an index that indicates temporal fluctuation of an optical signal. As shown in FIG. 1, the jitter is defined as a width of a location where optical eye pattern waveforms are integrated to the crossing point.

In order to improve the jitter of the optical signal obtained when the optical modulator is driven, in regards to the optical modulator or the driver for controlling driving of the optical modulator, the following characteristic improvement is required.

(1) Driver

A frequency characteristic is considered that a gain is uniform from a low frequency region to a high frequency region such that an inputted electric signal is amplified without being deteriorated.

(2) Optical Modulator

A frequency characteristic is considered that a frequency of an electro/optical conversion response is uniform from a low frequency region to a high frequency region such that an inputted electric signal is converted into an optical signal without being deteriorated.

As described above, when the frequency characteristics in the driver and the optical modulator are infinitely uniform (in a state in which frequency dependency does not exist), a jitter does not occur. However, actually, in the driver and the optical modulator, the frequency characteristic in the low frequency region may not be uniform, or the frequency characteristic in the high frequency region may deteriorate (descending toward the right), which causes the jitter. In particular, in recent years, a traveling-wave-type optical modulator with a 40 Gbps optical transmission has also been used. Therefore, an occurrence of the jitter becomes a critical problem.

In order to reduce the jitter, the characteristic of each of the driver and the optical modulator needs to be improved. However, improving characteristic of each of the driver and the optical modulator and adjusting each frequency characteristic to be uniform are very difficult.

For example, since the frequency characteristic of the driver may be determined at the design stage, it is difficult to improve the frequency characteristic of the driver during the manufacturing of the driver or after manufacturing the driver.

As disclosed in Patent Document 1 to be described below, if an impedance of a terminating portion of a modulation electrode of an optical modulator is adjusted, a frequency characteristic of the optical modulator can be improved. However, it is difficult to adjust the frequency characteristic to be uniform to a high frequency region that enables 40 Gbps optical transmission.

Further, as disclosed in Patent Document 1, when only the impedance of the termination of the modulation electrode of the optical modulator is adjusted, it is difficult to change a frequency region that needs to be adjusted in the frequency characteristic of the electro/optical conversion response of the traveling-wave-type optical modulator. Patent Document 1 Japanese Patent No. 3088988

Even when the frequency characteristic is individually excellent in each of the driver and the optical modulator, if the driver and the optical modulator are combined with each other, a jitter deteriorates, which lowers compatibility between the driver and the optical modulator.

For this reason, in order to obtain an excellent optical transmission characteristic that the jitter is small, there is a problem in that a selection of an optical modulator combined with the used driver or a selection of a driver combined with the used optical modulator needs to be performed.

DISCLOSURE OF THE INVENTION

Problems to be Solved by the Invention

The present invention has been made to solve the above-described problems, and it is an object of the present invention to provide a traveling-wave-type optical modulator and a method of adjusting the same, in which an occurrence of a jitter can be suppressed when an optical modulator is driven by using a driver. In particular, it is an object of the present invention to provide a traveling-wave-type optical modulator and a method of adjusting the same, in which a degree of freedom is improved when combining a driver and the traveling-wave-type optical modulator, while a jitter can be effectively suppressed from occurring even after combining the driver and the traveling-wave-type optical modulator.

Means for Solving the Problems

In order to solve the above-described problems, according to a first aspect of the invention, a traveling-wave-type optical modulator includes a substrate that has an electrooptic effect, an optical waveguide that is formed on the substrate, and a modulation electrode that performs modulation control on a light wave propagating through the optical waveguide. Further, a driver for performing driving control on the traveling-wave-type optical modulator is connected to the traveling-wave-type optical modulator, and a frequency characteristic of an electro/optical conversion response of the traveling-wave-type optical modulator is adjusted so as to correct a frequency characteristic of a gain of the driver.

According to a second aspect of the invention, the traveling-wave-type optical modulator according to the first aspect of the invention further includes a resistor of termination. In the adjustment of the frequency characteristic of the electro/optical conversion response, at least one of an impedance value of the modulation electrode or an impedance value of the resistor of termination is adjusted.

According to a third aspect of the invention, a traveling-wave-type optical modulator includes a substrate that has an electrooptic effect, an optical waveguide that is formed on the substrate, and a modulation electrode that performs modulation control on a light wave propagating through the optical waveguide. Further, a driver for performing driving control on the traveling-wave-type optical modulator is connected to the traveling-wave-type optical modulator, and a frequency characteristic of an electro/optical conversion response of the traveling-wave-type optical modulator is adjusted so as to correct a frequency characteristic of a gain of the driver within a specific frequency.

According to a fourth aspect of the invention, in the traveling-wave-type optical modulator according to the third aspect of the invention, in the adjustment of the frequency characteristic of the electro/optical conversion response in the specific frequency, at least one of an electrode length of the modulation electrode or an effective index of refraction of a microwave applied to the modulation electrode is adjusted.

According a fifth aspect of the invention, there is provided a method of adjusting a traveling-wave-type optical modulator that includes a substrate having an electrooptic effect, an optical waveguide formed on the substrate, and a modulation electrode performing modulation control on a light wave propagating through the optical waveguide. The method includes connecting a driver for performing driving control on the traveling-wave-type optical modulator to the traveling-wave-type optical modulator, and adjusting a frequency characteristic of an electro/optical conversion response of the traveling-wave-type optical modulator so as to correct a frequency characteristic of a gain of the driver.

According to a sixth aspect of the invention, in the method of adjusting a traveling-wave-type optical modulator according to the fifth aspect of the invention, the traveling-wave-type optical modulator further includes a resistor of termination, and in the adjustment of the frequency characteristic of the electro/optical conversion response, at least one of an impedance value of the modulation electrode or an impedance value of the resistor of termination is adjusted.

According to a seventh aspect of the invention, in the method of adjusting a traveling-wave-type optical modulator according to the sixth aspect of the invention, when having a frequency characteristic that a gain of the driver in a high frequency region increases, the impedance value of the resistor of termination is adjusted to be greater than the impedance value of the modulation electrode, and when having a frequency characteristic that the gain of the driver in the high frequency region decreases, the impedance value of the resistor of termination is adjusted to be smaller than the impedance value of the modulation electrode.

According to an eighth aspect of the invention, there is provided a method of adjusting a traveling-wave-type optical modulator that includes a substrate having an electrooptic effect, an optical waveguide formed on the substrate, and a modulation electrode performing modulation control on a light wave propagating through the optical waveguide. The method includes connecting a driver for performing driving control on the traveling-wave-type optical modulator to the traveling-wave-type optical modulator, and adjusting a frequency characteristic of an electro/optical conversion response of the traveling-wave-type optical modulator so as to correct a frequency characteristic of a gain of the driver within a specific frequency.

According to a ninth aspect of the invention, in the method of adjusting a traveling-wave-type optical modulator according to the eighth aspect of the invention, in the adjustment of the frequency characteristic of the electro/optical conversion response in the specific frequency, at least one of an electrode length of the modulation electrode or an effective index of refraction of a microwave applied to the modulation electrode is adjusted.

According to a tenth aspect of the invention, in the method of adjusting a traveling-wave-type optical modulator according to the ninth aspect of the invention, when the specific frequency is shifted to a low frequency side, the electrode length of the modulation electrode is increased or the effective index of refraction of the microwave applied to the modulation electrode is increased, and when the specific frequency is shifted to a high frequency side, the electrode length of the modulation electrode is decreased or the effective index of refraction of the microwave applied to the modulation electrode is decreased.

According to an eleventh aspect of the invention, in the method of adjusting a traveling-wave-type optical modulator according to any one of the fifth to tenth aspects, in the adjustment of the frequency characteristic of the electro/optical conversion response, when the traveling-wave-type optical modulator is driven by the driver, with respect to an electric signal inputted to the driver, a frequency characteristic of an electro/optical conversion response of an optical signal outputted by the traveling-wave-type optical modulator in a range of frequencies from 300 kHz to 3 GHz is adjusted to be substantially uniform. In the invention, 'becoming substantially uniform' means that the frequency characteristic of the electro/optical conversion response becomes a completely uniform state, and also means that the frequency characteristic after adjustment becomes more uniform than the frequency characteristic before adjustment.

Effects of the Invention

According to the first aspect of the invention, the frequency characteristic of the electro/optical conversion response of the traveling-wave-type optical modulator is adjusted so as to correct the frequency characteristic of the gain of the driver. As a result, in the traveling-wave-type optical modulator in a driving state, the optimal frequency characteristic of the electro/optical conversion response that substantially becomes uniform is obtained. Therefore, it is possible to achieve an excellent optical transmission characteristic that a jitter does not occur.

In addition, since the frequency characteristic does not need to be optimized with respect to each of the driver and the traveling-wave-type optical modulator, it is possible to improve a degree of freedom in the combination of the driver and the traveling-wave-type optical modulator.

According to the second aspect of the invention, the adjustment of the frequency characteristic of the electro/optical conversion response is performed by adjusting at least one of the impedance value of the modulation electrode or the impedance value of the resistor of termination. Therefore, even when the driver and the optical modulator are combined with each other, it is possible to easily correct the frequency characteristic of the electro/optical conversion response.

According to the third aspect of the invention, the frequency characteristic of the electro/optical conversion response of the traveling-wave-type optical modulator is adjusted so as to correct the frequency characteristic of the gain of the driver in the specific frequency. As a result, in the traveling-wave-type optical modulator in a driving state, the optimal frequency characteristic of the electro/optical conversion response that substantially becomes uniform is obtained. Therefore, it is possible to achieve an excellent optical transmission characteristic that a jitter does not occur.

In addition, since the frequency characteristic does not need to be optimized with respect to each of the driver and the traveling-wave-type optical modulator, it is possible to improve a degree of freedom in the combination of the driver and the traveling-wave-type optical modulator.

According to the fourth aspect of the invention, the adjustment of the frequency characteristic of the electro/optical conversion response in the specific frequency is performed by adjusting at least one of the electrode length of the modulation electrode or the effective index of refraction of the microwave applied to the modulation electrode. Therefore, the correction can be performed according to the frequency characteristic of the driver, and the adjustment of the optimal frequency characteristic of the electro/optical conversion response can be achieved.

According to the fifth aspect of the invention, the frequency characteristic of the electro/optical conversion response of the traveling-wave-type optical modulator is adjusted so as to correct the frequency characteristic of the gain of the driver. For this reason, the frequency characteristic does not need to be optimized with respect to each of the driver and the traveling-wave-type optical modulator. In addition, after the driver and the traveling-wave-type optical modulator are combined with each other, the frequency characteristic of the electro/optical conversion response of the traveling-wave-type optical modulator is adjusted. Therefore, in the traveling-wave-type optical modulator in a driving state, it is possible to easily obtain the optimal frequency characteristic of the electro/optical conversion response to be substantially uniform.

For this reason, the traveling-wave-type optical modulator does not need to be designed according to the specification of the used driver, and there is no restriction in the combination of the driver to be used and the traveling-wave-type optical modulator. Therefore, it is possible to drastically reduce the manufacturing cost.

According to the sixth aspect of the invention, in the adjustment of the frequency characteristic of the electro/optical conversion response, at least one of the impedance value of the modulation electrode or the impedance value of the resistor of termination is adjusted. Therefore, even when the driver and the optical modulator are combined with each other, it is possible to easily correct the frequency characteristic of the electro/optical conversion response.

According to the seventh aspect of the invention, when having the frequency characteristic that the gain in a high frequency region of the driver increases or decreases, the impedance value of the resistor of termination is adjusted to be greater or smaller than the impedance value of the modulation electrode. Therefore, even when the driver and the optical modulator are combined with each other, it is possible to easily correct the frequency characteristic of the electro/optical conversion response.

According to the eighth aspect of the invention, the frequency characteristic of the electro/optical conversion response of the traveling-wave-type optical modulator is adjusted so as to correct the frequency characteristic of the gain of the driver within the specific frequency. For this reason, the frequency characteristic does not need to be optimized with respect to each of the driver and the traveling-wave-type optical modulator. In addition, after the driver and the traveling-wave-type optical modulator are combined with each other, the frequency characteristic of the electro/optical conversion response of the traveling-wave-type optical modulator is adjusted. Therefore, in the traveling-wave-type optical modulator in a driving state, it is possible to easily obtain the optimal frequency characteristic of the electro/optical conversion response to be substantially uniform.

For this reason, the traveling-wave-type optical modulator does not need to be designed according to the specification of the used driver, and there is not restriction in the combination of the driver to be used and the traveling-wave-type optical modulator. Therefore, it is possible to drastically reduce the manufacturing cost.

According to the ninth aspect of the invention, the adjustment of the frequency characteristic of the electro/optical conversion response within the specific frequency is performed by adjusting at least one of the electrode length of the modulation electrode or the effective index of refraction of the microwave applied to the modulation electrode. Therefore, the correction can be performed according to the frequency characteristic of the driver, and the adjustment of the optimal frequency characteristic of the electro/optical conversion response can be achieved.

According to the tenth aspect of the invention, when the specific frequency is shifted to a low frequency side, the electrode length of the modulation electrode is increased or the effective index of refraction of the microwave applied to the modulation electrode is increased, and when the specific frequency is shifted to a high frequency side, the electrode length of the modulation electrode is decreased or the effective index of refraction of the microwave applied to the modulation electrode is decreased. As a result, since the specific frequency can be easily set, it is possible to achieve the optimal adjustment of the frequency characteristic of the electro/optical conversion response.

According to the eleventh aspect of the invention, in the adjustment of the frequency characteristic of the electro/optical conversion response, when the traveling-wave-type optical modulator is driven by the driver, the frequency characteristic of the electro/optical conversion response in a range of from 300 kHz to 3 GHz is adjusted to be substantially uniform. In the signal frequencies applied to the traveling-wave-type optical modulator, the frequency characteristic of the electro/optical conversion response does not need to be substantially uniform, and the adjustment becomes easier. In addition, the signal frequency in the range as described above is adjusted, so that it is possible to effectively suppress the jitter occurring at the time of the high-speed optical transmission.

REFERENCE NUMERALS

1: INCIDENT-SIDE OPTICAL FIBER
2: POLARIZER
3: OPTICAL WAVEGUIDE
4: GROUND ELECTRODE
5: SIGNAL ELECTRODE
6: HIGH FREQUENCY CABLE
7: DRIVER

8: RESISTOR OF TERMINATION
9: SUBSTRATE
10: EMITTING-SIDE OPTICAL FIBER
11: ELECTRODE PAD

BEST MODES FOR CARRYING OUT THE INVENTION

Hereinafter, the preferred embodiments of the present invention will be described in detail.

The invention provides a traveling-wave-type optical modulator, and a method of adjusting the same. The traveling-wave-type optical modulator includes a substrate that has an electrooptic effect, an optical waveguide that is formed on the substrate, and a modulation electrode that performs modulation control of a light wave propagating through the optical waveguide. In this case, a driver for controlling driving of the traveling-wave-type optical modulator is connected to the traveling-wave-type optical modulator, and a frequency characteristic of an electro/optical conversion response of the traveling-wave-type optical modulator is adjusted so as to correct a frequency characteristic of a gain of the driver.

Further, the present invention provides a traveling-wave-type optical modulator and a method of adjusting the same. The traveling-wave-type optical modulator includes a substrate that has an electrooptic effect, an optical waveguide that is formed on the substrate, and a modulation electrode that performs modulation control of a light wave propagating through the optical waveguide. In this case, a driver for controlling driving of the traveling-wave-type optical modulator is connected to the traveling-wave-type optical modulator, and a frequency characteristic of an electro/optical conversion response of the traveling-wave-type optical modulator is adjusted so as to correct a frequency characteristic of a gain of the driver within a specific frequency.

Figure 1:
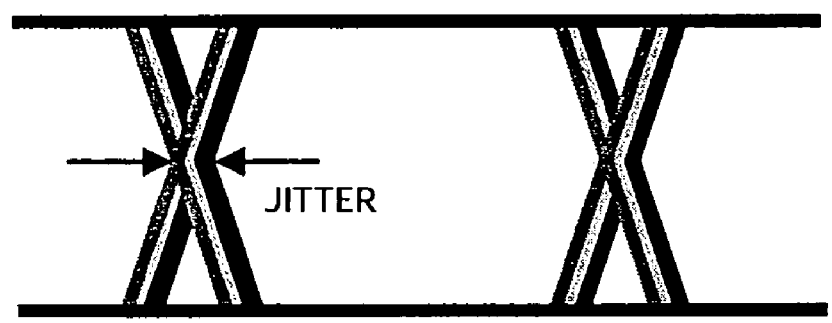
FIG. 1 is a schematic diagram illustrating a jitter.
Figure 2:
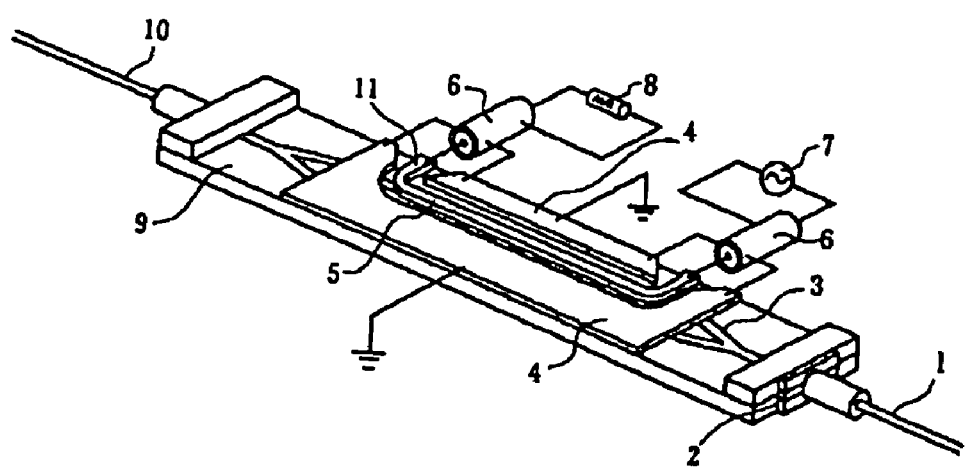
FIG. 2 is a perspective view illustrating a schematic structure of a traveling-wave-type optical modulator.

FIG. 2 is a schematic diagram illustrating a traveling-wave-type optical modulator according to an embodiment of the invention.

A substrate 9 is a substrate having an electrooptic effect. The substrate 9 is made of a material, such as, for example, lithium niobate, lithium tantalite, PLZT (lead lanthanum zirconate titanate), and a quartz system. Specifically, the substrate 9 is formed of an X-cut plate, a Y-cut plate, and a Z-cut plate made of these single crystal materials. In particular, the material of lithium niobate (LN) can easily construct an optical waveguide device, and make the substrate 9 have large anisotropy. Therefore, the material of lithium niobate (LN) is preferably used at the time of forming the substrate 9.

An optical waveguide 3 is a so-called Mach-Zehnder optical waveguide. The optical waveguide 3 is formed by depositing, for example, titanium (Ti) or the like on the substrate 9 and performing thermal diffusion on it. Although not shown in FIG. 2, in order to reduce absorption of the light propagating through the optical waveguide 3 into the electrode layer, a buffer layer made of a material, such as silicon oxide ($SiO_2$), may be formed on the substrate 9. Each of a ground electrode 4 and a signal electrode 5, which are modulation electrodes, is formed of a metal, such as gold (Au) or the like. Further, in FIG. 2, in order to remove an extra component of incident light to make polarization uniform, a polarizer 2 is provided.

High-speed optical transmission using the traveling-wave-type optical modulator shown in FIG. 2 is performed as follows.

The incident light is incident through an incident-side optical fiber 1, then passes through the polarizer 2, and is then divided into two portions to propagate through two branched waveguides of the optical waveguide 3. Meanwhile, the driver 7 applies a transmission signal including a signal component of a microwave band to the signal electrode 5 through a high frequency cable 6. The transmission signal is applied to guided light propagating through the optical waveguide 3 as a forward electric signal in the same direction as the propagating direction of the guided light propagating through the optical waveguide 3.

When the electric signal is applied, an index of refraction of the optical waveguide varies. As a result, a phase of the guided wave, which propagates through the optical waveguide having been divided into two portions, varies due to the variation in index of refraction. Therefore, when the guided light components that propagate through the branched waveguides of the optical waveguide 3 are coupled again at the terminating end of the optical waveguide 3, the guided light components that have been synthesized interfere with each other, and the emitted light varies according to the phase difference between the guided light components that have propagated through the branched waveguides of the optical waveguide 3.

Generally, when transmitting the transmission signal including a signal component of the microwave band at a high-speed, impedance (characteristic impedance) of the ground electrode 4 and the signal electrode 5 is set to match with impedance of the driver 7, such that the transmission signal inputted to the signal electrode 5 by the driver 7 is effectively inputted without being reflected to the outside. Further, in order for the transmission signal inputted to the signal electrode 5 not to be outputted from the output side of the signal electrode, a resistor of termination 8 having a resistance value that corresponds to the same value as the characteristic impedance is generally disposed on the output side of the traveling-wave-type optical modulator shown in FIG. 2 so as to match impedance.

However, when adjusting the frequency characteristic of the electro/optical conversion response of the traveling-wave-type optical modulator, the modulation electrode and the resistor of termination are adjusted including the setting of the impedance of the modulation electrode and the impedance of the resistor of termination such that the impedance of the modulation electrode and the impedance of the resistor of termination are different from each other, which effectively uses reflection of the microwave in the connection portion from the resistor of termination to the modulation electrode.

Figure 3:
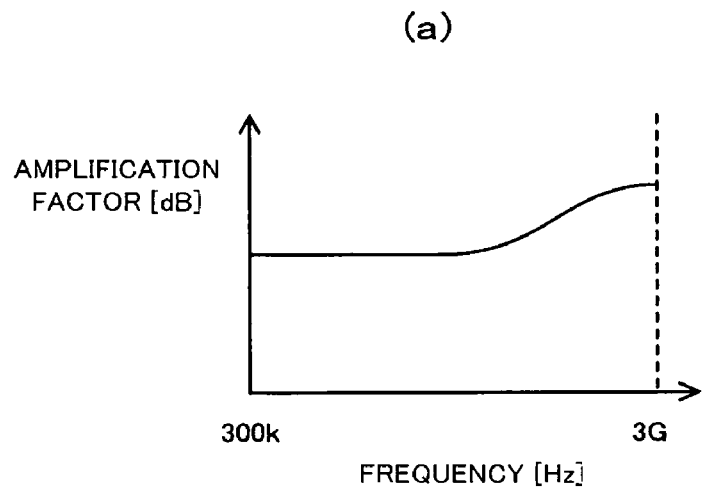
FIG. 3 is a schematic diagram illustrating a frequency characteristic of a gain of a driver.
Figure 3:
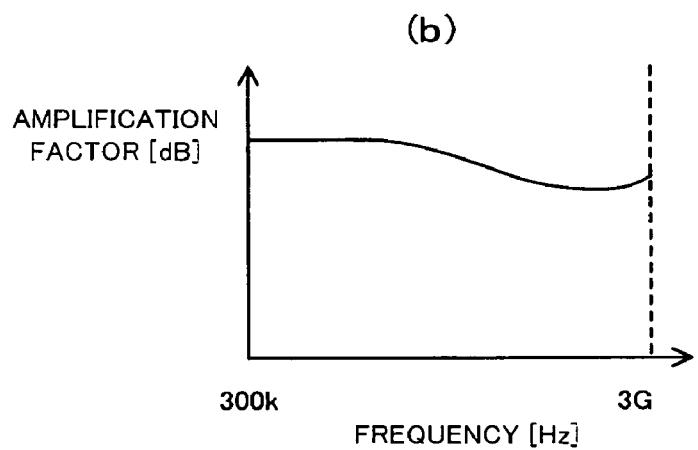

In the driver 7, the frequency characteristic of the gain is different depending on the types of devices. The driver 7 has various characteristics, such that for example, as shown in FIG. 3, the gain is increased in a region where the frequency is high (see FIG. 3A), and the gain is decreased in a region where the frequency is high (see FIG. 3B).

Meanwhile, similar to the frequency characteristic of the gain of the driver, the frequency characteristic of the electro/optical conversion response of the traveling-wave-type optical modulator has a variety of frequency dependency.

For this reason, in order to reduce the jitter of the traveling-wave-type optical modulator, it is very difficult for the frequency characteristic of a simple substance of the driver or the optical modulator to be individually adjusted. However, as the result of continual research, the inventors have discovered that the above-described problems can be resolved by adjusting the frequency characteristic (frequency characteristic of the electro/optical conversion response) when the driver and the traveling-wave-type optical modulator are combined with each other to be uniform.

Figure 4:
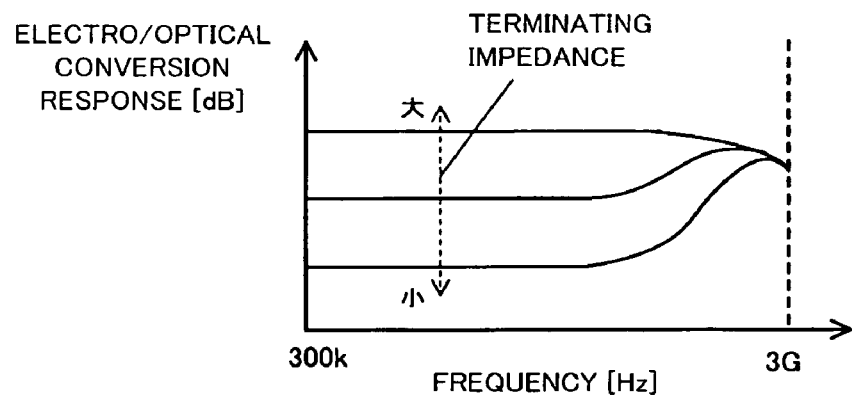
FIG. 4 is a schematic diagram illustrating a method of adjusting a frequency characteristic of an electro/optical conversion response of a traveling-wave-type optical modulator.

According to the relationship between the impedance value of the modulation electrode and the impedance value of the resistor of termination in the traveling-wave-type optical modulator, the frequency characteristic of the electro/optical conversion response of the traveling-wave-type optical modulator shows a variety of frequency dependency, as shown in FIG. 4. Specifically, in a state in which the impedance value of the modulation electrode is set to a reference impedance value, when the impedance value of the resistor of termination becomes greater than the reference impedance value, the frequency characteristic of the electro/optical conversion response of the optical modulator is decreased in a region where the frequency is high. In contrast, when the impedance value of the resistor of termination becomes smaller than the reference impedance value, the frequency characteristic of the electro/optical conversion response of the optical modulator is increased in a region where the frequency is high.

Further, in the frequency characteristic of the electro/optical conversion response of the traveling-wave-type optical modulator, the frequency band that varies in upward and downward directions can be determined by the length of the modulation electrode and the effective index of refraction of the microwave applied to the modulation electrode.

That is, the varied frequency f can be simply represented by Equation 1.

$$f = c/l(n_e + n_m) \quad \text{[Equation 1]}$$

In this case, reference character c indicates light velocity, reference character l indicates the length of the modulation electrode (electrode length by which the microwave signal propagates), reference character $n_e$ indicates an index of refraction of the waveguide to the light wave, and reference character $n_m$ indicates an effective index of refraction of the microwave.

Therefore, when varying in a frequency direction a frequency band in which the frequency characteristic of the electro/optical conversion response varies in upward and downward directions, it can be achieved by adjusting the electrode length, the effective index of refraction of the microwave, and the index of refraction of the optical waveguide.

In this invention, by using the fact that the frequency characteristic of the electro/optical conversion response of the traveling-wave-type optical modulator can be varied by adjusting, even when any one of drivers having various frequency characteristics is selected, the uniform frequency characteristic (frequency characteristic of the electro/optical conversion response) can be achieved by adjusting the frequency characteristic of the electro/optical conversion response of the traveling-wave-type optical modulator, such that the frequency characteristic of the driver is compensated for, in a state in which the driver and the traveling-wave-type optical modulator are combined with each other.

For example, when using the driver having the frequency characteristic that the gain is increased in a region where the frequency is high, as shown in FIG. 3A or FIG. 5A, the traveling-wave-type optical modulator is adjusted such that the frequency characteristic of the electro/optical conversion response is decreased in a region where the frequency is high, as shown in FIG. 5B. This adjustment can be performed by making the impedance value of the resistor of termination greater than the impedance value of the modulation electrode.

As a result, the traveling-wave-type optical modulator having the characteristic shown in FIG. 5B is driven by the driver having the characteristic shown in FIG. 5A. In a region where the frequency is high, the variation of the frequency characteristic of the electro/optical conversion response of the optical modulator compensates for the variation of the frequency characteristic of the driver. As a result, it is possible to achieve a traveling-wave-type optical modulator having the frequency characteristic of the electro/optical conversion response to be uniform at the time of being driven, as shown in FIG. 5C.

Figure 5:
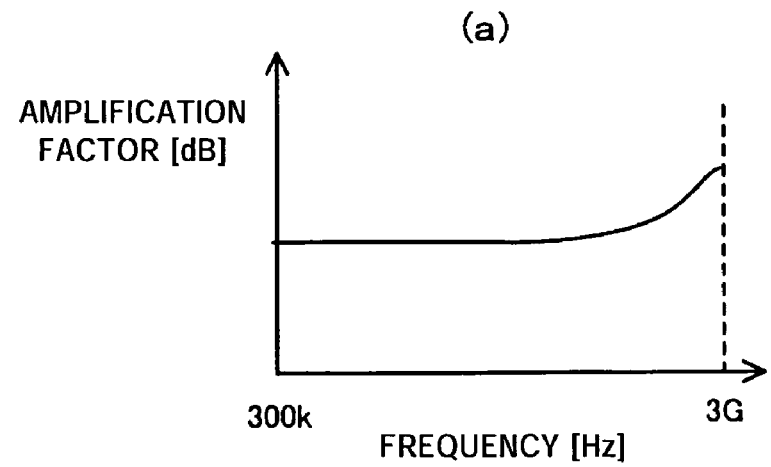
FIG. 5 is a schematic diagram illustrating an example of a method of adjusting a traveling-wave-type optical modulator according to an embodiment of the invention.
Figure 5:
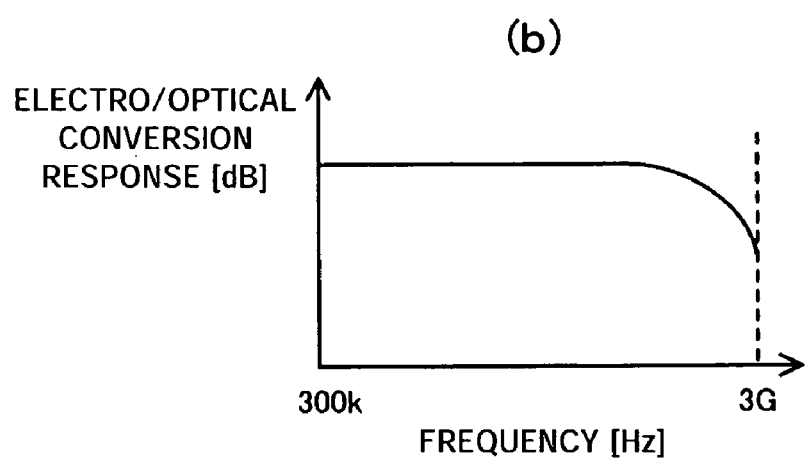
Figure 5:
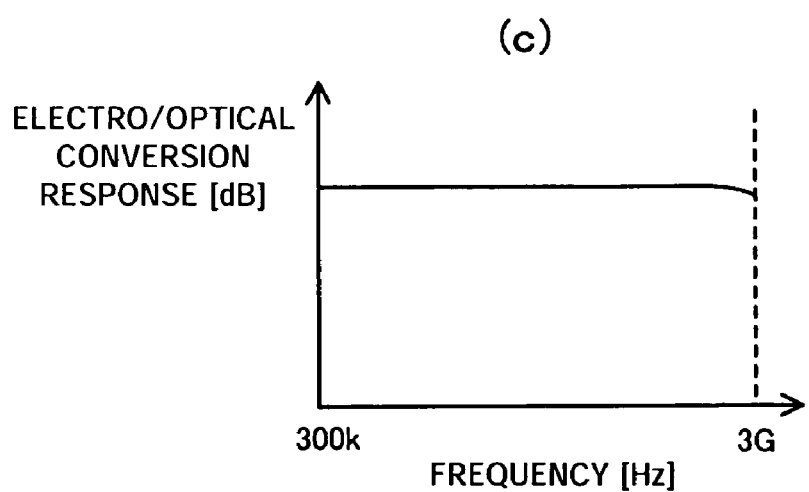
Figure 6:
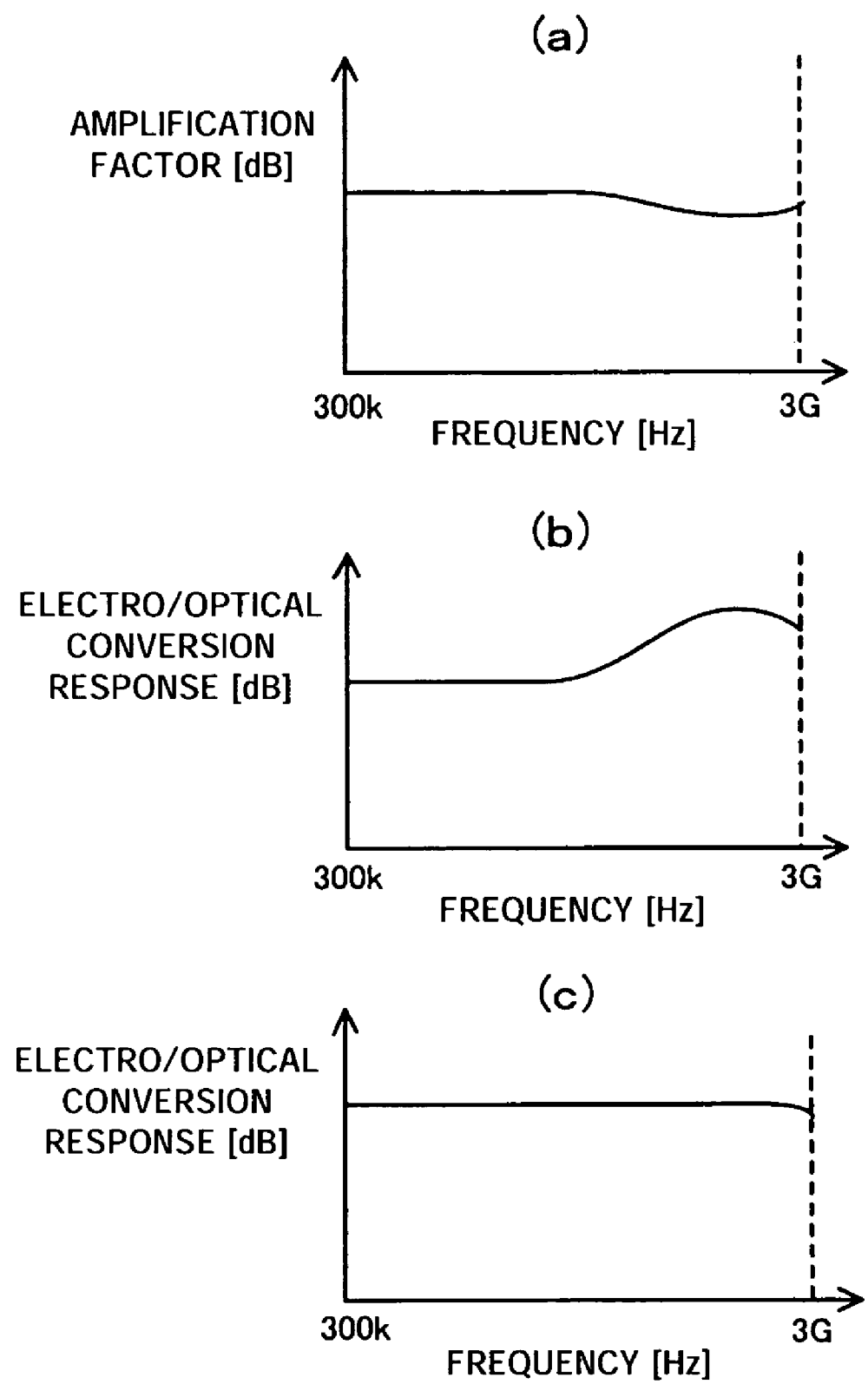
FIG. 6 is a schematic diagram illustrating another example of a method of adjusting a traveling-wave-type optical modulator according to an embodiment of the invention.

Further, similar to FIG. 5, even when using the driver having the frequency characteristic that a gain is decreased in a region where the frequency is high, as shown in FIG. 3B or FIG. 6A, the traveling-wave-type optical modulator is adjusted such that the frequency characteristic of the electro/optical conversion response is increased in a region where the frequency is high, as shown in FIG. 6B. This adjustment can be performed by making the impedance value of the resistor of termination smaller than the impedance value of the modulation electrode.

As a result, the traveling-wave-type optical modulator having the characteristic shown in FIG. 6B is driven by the driver having the characteristic shown in FIG. 6A. In a region where the frequency is high, the variation of the frequency characteristic of the electro/optical conversion response of the optical modulator compensates for the variation of the frequency characteristic of the driver. As a result, it is possible to achieve a traveling-wave-type optical modulator having the frequency characteristic of the electro/optical conversion response to be uniform at the time of being driven, as shown in FIG. 6C.

As methods of adjusting impedance of the modulation electrode or impedance of the resistor of termination, various methods, such as for example, a method of trimming a resistive thin film of a resistor of termination to vary a resistance value, a method of installing a variable resistor in a circuit for forming a resistor of termination, a method of trimming an electrode shape of a modulation electrode to vary an impedance value, a method of providing or removing a dielectric in an electrode or between electrodes, a method of trimming an electrode pattern for forming a resistor circuit, and the like, may be used.

As a result of studies and research on the relationship between the frequency characteristic (frequency characteristic of the electro/optical conversion response) when the driver and the traveling-wave-type optical modulator are combined with each other, and the jitter occurrence, the inventors have discovered the fact that even at the time of the high-speed optical transmission (for example, 10 Gbps), the jitter can be effectively suppressed by adjusting the frequency characteristic of the electro/optical conversion response within a range of frequencies of 300 kHz to 3 GHz substantially to be uniform. In particular, when adjusting the frequency characteristic of the electro/optical conversion response to be substantially uniform, an important point is as follows. That is, in a state in which the range is divided into a low frequency range (for example, a range of from 300 kHz to several tens of MHz) and a high frequency range (for example, a range of from several tens of MHz to 3 GHz), when the two ranges are compared with each other, the frequency characteristic is adjusted to become substantially the same level in the two ranges.

Figure 7:
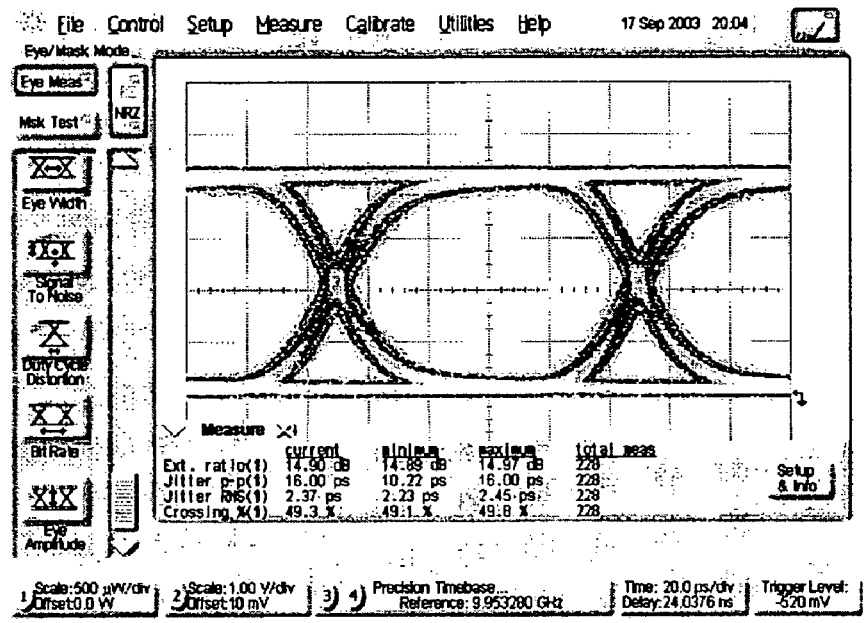
FIG. 7 is a diagram illustrating the result of measuring an optical eye diagram.
Figure 7:
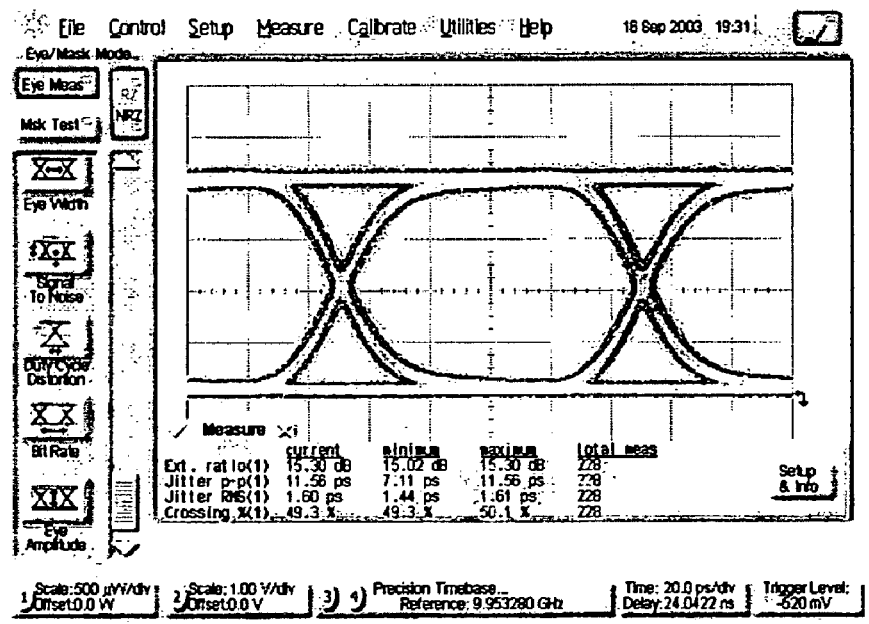

FIG. 7 shows the result measured before and after adjusting an optical eye diagram in a case in which an input signal of 10 Gbps is applied to the traveling-wave-type optical modulator that has adjusted the frequency characteristic of the electro/optical conversion response in a range of 300 kHz to 3 GHz.

The specific adjustment method is as follows. First, each of the frequency characteristic of the gain of the driver (TGA4953, manufactured by TriQuint Semiconductor, Inc.), and the frequency characteristic of the electro/optical conversion response of the traveling-wave-type optical modulator (manufactured by Sumitomo Osaka Cement Co., Ltd.) is measured by a light component analyzer (8702D, manufactured by Agilent Technologies). While referring to the measured result, the resistance value of the resistor of termination that is connected to the optical modulator is varied, and the frequency characteristic of the electro/optical conversion response when the driver and the traveling-wave-type optical modulator are combined is adjusted such that it is substantially uniform within a range of 300 kHz to 3 GHz.

Before and after adjusting the frequency characteristic of the electro/optical conversion response, in a state in which the driver is connected to the traveling-wave-type optical modulator, an input signal of a speed of 10 Gbps (($2^{31}-1$)-th stage in the NRZ format) is applied to the driver by a pulse pattern generator (MP1761B, manufactured by Anritsu Corporation), and a laser beam is made to be incident on the optical modulator, the light emitted from the optical modulator is observed by using a digital sampling oscilloscope (86109B, manufactured by Agilent Technologies).

FIG. 7 shows the result of the optical modulator obtained before adjustment. A root-mean-square (RMS) value of the jitter is 2.4 ps before adjustment, but it is improved to 1.6 ps after adjustment.

Therefore, it can be understood that the improvement of the frequency characteristic of the electro/optical conversion response in the range of 300 kHz to 3 GHz can effectively suppress the jitter with respect to the high frequency of the transmission signal at 10 Gbps.

Further, the variation of the jitter when adjusting the impedance of the modulation electrode or the resistor of termination to vary will be described.

Figure 8:
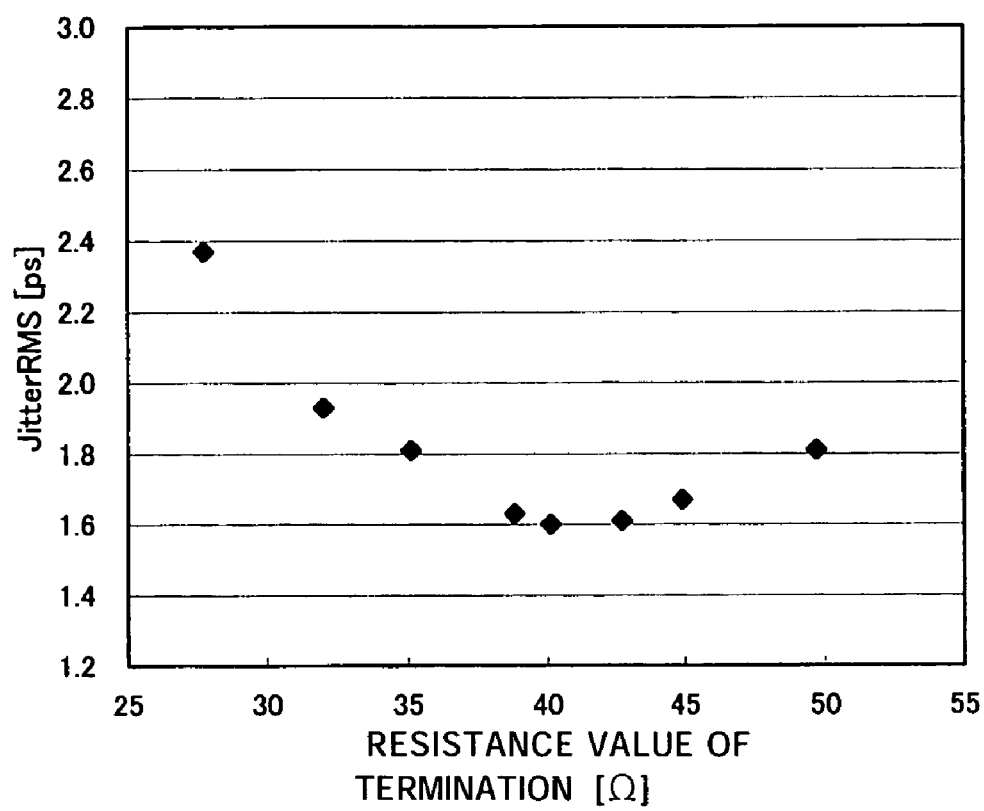
FIG. 8 is a graph illustrating a relationship between a resistance value of termination and jitter.

FIG. 8 shows an example of a case in which the impedance (resistance value) of the resistor of termination is adjusted to vary. It can be understood that the jitter is deteriorated on the basis of a resistance 40Ω of the resistor of termination, and there is an optimal impedance value that can minimize the jitter. This phenomenon is equally generated even in a case in which another traveling-wave-type optical modulator and another driver are combined with each other or a case in which the impedance of the modulation electrode is adjusted to vary.

For this reason, instead of the adjusting the frequency characteristic of the electro/optical conversion response when the driver and the traveling-wave-type optical modulator are combined with each other to be substantially uniform, the frequency characteristic of the electro/optical conversion response can be adjusted by selecting the proper impedance value at which the minimal jitter is generated.

When the difference between the impedance of the modulation electrode and the impedance of the resistor of termination is large, a reflective amount of the microwave in the connection portion from the resistor of termination to the modulation electrode is increased. If the reflective amount of the microwave is excessively increased, optical modulation efficiency of the traveling-wave-type optical modulator is lowered, and a driving voltage is increased, or an electric reflection characteristic (S11) of the traveling-wave-type optical modulator is deteriorated.

In order to avoid the above-described problems, the adjustment range of the difference between the impedance of the modulation electrode and the impedance of the resistor of termination is preferably restricted to a range of ±20Ω from a value where the impedance of the modulation electrode is equal to the impedance of the resistor of termination.

Next, an adjustment method of varying a frequency band where the frequency characteristic of the electro/optical conversion response of the traveling-wave-type optical modulator is varied in upward and downward directions in a frequency direction will be described.

As shown by Equation 1 described above, when varying in a frequency direction a frequency band where the frequency characteristic of the electro/optical conversion response varies in upward and downward directions, it can be achieved by adjusting the electrode length, the effective index of refraction of the microwave, and the index of refraction of the optical waveguide.

In regards to the electrode length of the modulation electrode, if the electrode length is increased, the adjusted frequency band is shifted to the low frequency side, and if the electrode length is decreased, the frequency band is shifted to the high frequency side.

In a state in which a plurality of different types of optical modulators having different electrode lengths are prepared in advance, any one of the plurality of optical modulators is selected according to the frequency band in which the frequency characteristic of the driver is corrected and the impedance of the modulation electrode and the impedance of the resistor of termination are adjusted. As a result, it is possible to adjust to be substantially uniform the frequency characteristic of the electro/optical conversion response when the driver and the traveling-wave-type optical modulator are combined with each other.

Further, electrode patterns capable of selecting a plurality of electrode lengths are formed in one optical modulator, and an electrode pad when being connected to the modulation electrode can be made to be selected, or an electrode on the substrate is trimmed to vary the transmission path of the microwave. Like this, it is possible to use an optical modulator in which the electrode length is variable.

In regards to the effective index of refraction of the microwave, if the effective index of refraction is increased, the adjusted frequency band is shifted to the low frequency side, and if the effective index of refraction is decreased, the frequency band is shifted to the high frequency side.

When varying the effective index of refraction of the microwave, various methods, such as a method of varying the width of a signal electrode of the modulation electrodes, a method of varying a gap between the signal electrode and the ground electrode, a method of varying the thickness of the buffer layer of the optical modulator, and the like, may be used.

Similar to the case of varying the electrode length, when using the above-described methods, a plurality of kinds of optical modulators having different effective indexes of refraction of microwaves are prepared in advance, and any one of the plurality of optical modulators is selected according to the frequency band in which the frequency characteristic of the driver is corrected. Further, the effective index of refraction of the microwave can be adjusted by various methods, such as a method of trimming the electrode to vary the shape of the electrode, a method of providing or removing a dielectric between the signal electrode and the ground electrode, and the like, after manufacturing the traveling-wave-type optical modulator.

Further, by varying the index of refraction of the optical waveguide with respect to the light wave, it is possible to vary in a frequency direction the frequency band where the frequency characteristic of the electro/optical conversion response is varied in upward and downward directions, and the index of refraction of the optical waveguide can be easily adjusted by doping MgO or the like into the substrate.

However, if the index of refraction of the optical waveguide varies, an optical path length of the light wave varies, which causes the optical path length set in advance for every optical modulator to deviate from a designed value. Therefore, when the above-described method is used, attention should be paid.

INDUSTRIAL APPLICABILITY

As described above, the present invention can provide a traveling-wave-type optical modulator and a method of adjusting the same, in which the jitter can be suppressed from occurring when the optical modulator is driven by using the driver. In particular, the invention can provide a traveling-wave-type optical modulator and a method of adjusting the same, in which a degree of freedom is improved when combining the driver and the traveling-wave-type optical modulator, and the jitter can be effectively suppressed from occurring after combining the driver and the traveling-wave-type optical modulator.

What is claimed is:

1. A traveling-wave-type optical modulator, comprising:
   a substrate that has an electrooptic effect;
   an optical waveguide that is formed on the substrate; and
   a modulation electrode that performs modulation control on a light wave propagating through the optical waveguide,
   wherein a driver for performing driving control on the traveling-wave-type optical modulator is connected to the traveling-wave-type optical modulator,
   a frequency characteristic of an electro/optical conversion response of the traveling-wave-type optical modulator is adjusted so as to correct a frequency characteristic of a gain of the driver, and
   in the adjustment of the frequency characteristic of the electro/optical conversion response, when the traveling-wave-type optical modulator is driven by the driver, with respect to an electric signal inputted to the driver, a frequency characteristic of an electro/optical conversion response of an optical signal outputted by the traveling-wave-type optical modulator in a range of frequencies from 300 kHz to 3 GHz is adjusted to be substantially uniform.

2. The traveling-wave-type optical modulator according to claim 1, further comprising:
   a resistor of termination,
   wherein, in the adjustment of the frequency characteristic of the electro/optical conversion response, at least one of an impedance value of the modulation electrode or an impedance value of the resistor of termination is adjusted.

3. The traveling-wave-type optical modulator according to claim 1,
   wherein, in the adjustment of the frequency characteristic of the electro/optical conversion response, at least one of an electrode length of the modulation electrode or an effective index of refraction of a microwave applied to the modulation electrode is adjusted.

4. A method of adjusting a traveling-wave-type optical modulator that includes a substrate having an electrooptic effect, an optical waveguide formed on the substrate, and a modulation electrode performing modulation control on a light wave propagating through the optical waveguide, comprising the steps of:
   connecting a driver for performing driving control on the traveling-wave-type optical modulator to the traveling-wave-type optical modulator; and
   adjusting a frequency characteristic of an electro/optical conversion response of the traveling-wave-type optical modulator so as to correct a frequency characteristic of a gain of the driver,
   wherein, in the adjustment of the frequency characteristic of the electro/optical conversion response, when the traveling-wave-type optical modulator is driven by the driver, with respect to an electric signal inputted to the driver, a frequency characteristic of an electro/optical conversion response of an optical signal outputted by the traveling-wave-type optical modulator in a range of frequencies from 300 kHz to 3 GHz is adjusted to be substantially uniform.

5. The method of adjusting a traveling-wave-type optical modulator according to claim 4,
   wherein the traveling-wave-type optical modulator further includes a resistor of termination, and
   in the adjustment of the frequency characteristic of the electro/optical conversion response, at least one of an impedance value of the modulation electrode or an impedance value of the resistor of termination is adjusted.

6. The method of adjusting a traveling-wave-type optical modulator according to claim 5,
   wherein, when having a frequency characteristic that a gain of the driver in a high frequency region increases, the impedance value of the resistor of termination is adjusted to be greater than the impedance value of the modulation electrode, and
   when having a frequency characteristic that the gain or the driver in the high frequency region decreases, the impedance value of the resistor of termination is adjusted to be smaller than the impedance value of the modulation electrode.

7. The method of adjusting a traveling-wave-type optical modulator according to claim 4,
   wherein, in the adjustment of the frequency characteristic of the electro/optical conversion response, at least one of an electrode length of the modulation electrode or an effective index of refraction of a microwave applied to the modulation electrode is adjusted.

8. The method of adjusting a traveling-wave-type optical modulator according to claim 7,
   wherein, when an adjusted frequency band is shifted to a low frequency side, the electrode length of the modulation electrode is increased or the effective index of refraction of the microwave applied to the modulation electrode is increased, and
   when the adjusted frequency band is shifted to a high frequency side, the electrode length of the modulation electrode is decreased or the effective index of refraction of the microwave applied to the modulation electrode is decreased.

* * * * *